(12) United States Patent  
Welker et al.

(10) Patent No.: US 11,491,514 B2
(45) Date of Patent: Nov. 8, 2022

(54) DEVICE AND METHOD FOR SELECTING PACKS BEING MOVED AT A HIGH SPEED

(71) Applicant: QUISS QUALITAETS-INSPEKTIONSSYSTEME UND SERVICE GMBH, Puchheim (DE)

(72) Inventors: Stefan Welker, Nohfelden (DE); Bernhard Gruber, Stockdorf (DE)

(73) Assignee: QUISS QUALITAETS-INSPEKTIONSSYSTEME UND SERVICE GMBH, Puchheim (DE)

( * ) Notice: Subject to any disclaimer, the term of this patent is extended or adjusted under 35 U.S.C. 154(b) by 305 days.

(21) Appl. No.: 16/610,599

(22) PCT Filed: May 4, 2018

(86) PCT No.: PCT/EP2018/061586
§ 371 (c)(1),
(2) Date: Jan. 20, 2020

(87) PCT Pub. No.: WO2018/202886
PCT Pub. Date: Nov. 8, 2018

(65) Prior Publication Data
US 2020/0139407 A1 May 7, 2020

(30) Foreign Application Priority Data
May 4, 2017 (DE) .......................... 102017004358.2

(51) Int. Cl.
*B07C 5/34* (2006.01)
*B07C 5/342* (2006.01)
*B65G 47/48* (2006.01)

(52) U.S. Cl.
CPC ............ *B07C 5/342* (2013.01); *B07C 5/3408* (2013.01); *B65G 47/48* (2013.01); *B65G 2201/0244* (2013.01); *B65G 2201/0252* (2013.01)

(58) Field of Classification Search
CPC ......... B07C 5/02; B07C 5/3408; B07C 5/342; B07C 5/362; B07C 5/363; B07C 5/367;
(Continued)

(56) References Cited

U.S. PATENT DOCUMENTS 3,471,012 A   10/1969   Calhoun
3,771,648 A   11/1973   Revuelta
(Continued)

FOREIGN PATENT DOCUMENTS

DE   2 216 612 A1   10/1972
DE   2 358 185 A1   11/1974
(Continued)

OTHER PUBLICATIONS

PCT International Written Opinion and Search Report dated Jul. 17, 2018, Application No. PCT/EP2018/061586, 8 Pages.
(Continued)

*Primary Examiner* — Joseph C Rodriguez
(74) *Attorney, Agent, or Firm* — Brooks Kushman P.C.

(57) ABSTRACT

An apparatus for sorting containers, in particular, beverage containers, may comprise at least one conveyor belt for transporting a multitude of containers, an identification device for identifying a decor on each container conveyed on the conveyor belt, wherein selection data can be generated by the identification device depending on the respective decor present on a specifically detected container, and a selection device for repositioning individual containers on the conveyor belt depending on the respectively identified decor. The selection device forms a continuous track and has (Continued)

shifting means for shifting the identified containers. The continuous track extends along the conveyor belt in a selection region, and the individual shifting means in the selection region can be accelerated to the same speed as the conveyor belt by means of a transport device, thereby being adjacent to a specific and previously identified container.

19 Claims, 6 Drawing Sheets

(58) Field of Classification Search
CPC .. B07C 5/368; B65G 47/48; B65G 2201/0252
See application file for complete search history.

(56) References Cited

U.S. PATENT DOCUMENTS

| | | | |
|---|---|---|---|
| 3,791,518 A | 2/1974 | Vanderhoof | |
| 4,320,840 A | 3/1982 | Braschos | |
| 4,501,365 A | 2/1985 | Peyton et al. | |
| 4,776,466 A * | 10/1988 | Yoshida | B07C 5/3408 209/939 |
| 4,986,407 A * | 1/1991 | Heuft | B65G 47/766 198/367 |
| 4,988,435 A | 1/1991 | Kimura et al. | |
| 6,755,298 B1 | 6/2004 | Heuft et al. | |
| 7,410,045 B2 * | 8/2008 | Patterson | B65B 35/405 198/370.07 |
| 7,886,891 B2 * | 2/2011 | Ranger | B65G 47/82 209/555 |
| 9,120,328 B2 * | 9/2015 | Lindner | B41J 29/393 |
| 9,550,632 B2 * | 1/2017 | Winkler | B65G 47/71 |
| 10,005,621 B2 * | 6/2018 | Strauch | B65G 47/082 |
| 10,309,908 B2 * | 6/2019 | Kress | G01N 21/952 |
| 10,845,316 B2 * | 11/2020 | Pinto | G01B 5/0004 |
| 2017/0144842 A1 * | 5/2017 | Huang | B07C 5/36 |

FOREIGN PATENT DOCUMENTS

| | | |
|---|---|---|
| DE | 29 24 312 A1 | 12/1980 |
| DE | 29 41 576 A1 | 4/1981 |
| DE | 32 44 331 A1 | 5/1984 |
| DE | 38 51 036 T2 | 12/1994 |
| DE | 297 16 459 U1 | 1/1999 |
| DE | 200 02 411 U1 | 6/2001 |
| DE | 10 2008 051 919 A1 | 4/2010 |
| DE | 10 2010 062 830 A1 | 6/2012 |

OTHER PUBLICATIONS

European Notice of Opposition dated Jun. 8, 2022 (with English Machine Translation) Application No./Patent No. 18722528.9-1014/ 3618976 Applicant Quiss Qualitats-Inspektionssysteme und Service GmbH, 42 Pages.

* cited by examiner

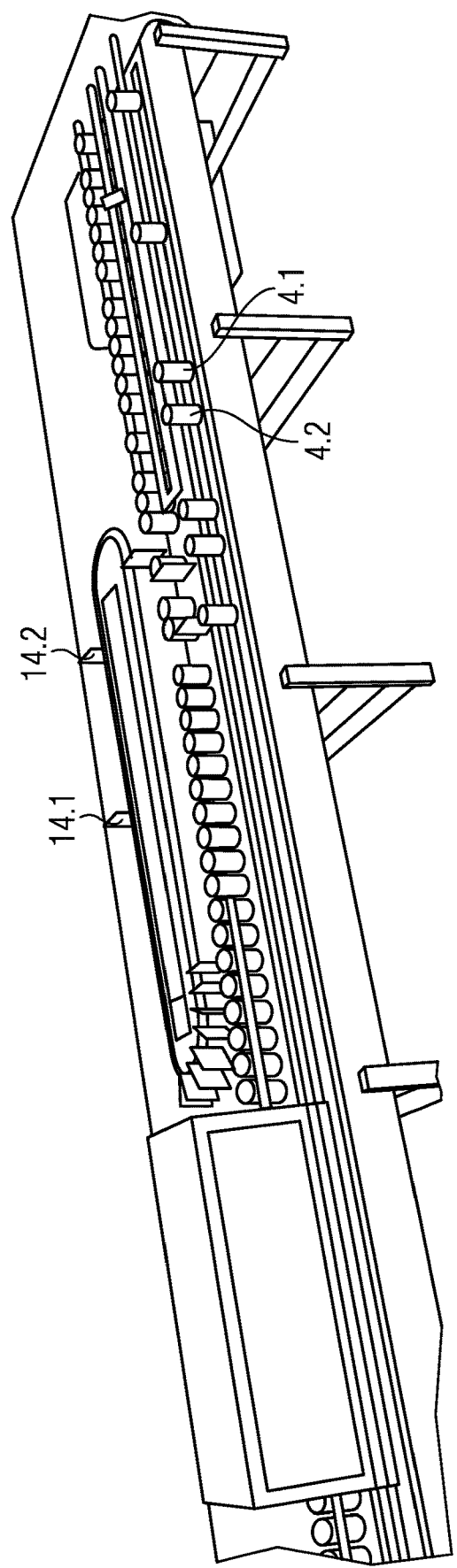

DEVICE AND METHOD FOR SELECTING PACKS BEING MOVED AT A HIGH SPEED

CROSS-REFERENCE TO RELATED APPLICATIONS

This application is a U.S. national phase of PCT Application No. PCT/EP2018/081588 filed on May 4, 2018, which claims priority to German Patent Application No. 10 2017 004 358.2 filed on May 4, 2017, the disclosures of which are incorporated in their entireties by reference herein.

TECHNICAL FIELD

The present disclosure relates to an apparatus for sorting containers and to a method for sorting containers.

BACKGROUND

The sorting of containers occurs in different industries and can be subject to various constraints depending on the container type. In the context of the present disclosure, containers are preferably understood as beverage containers, such as cans or bottles, in particular made of glass or plastic. Thus, a container can consist of exactly such a beverage container.

It is known from the production and filling of cans that cans are conveyed at the same time on the same conveyor belt for holding various beverages. Thereby, a set of differently designed cans can be transported for holding various beverages.

SUMMARY

According to the disclosure, however, instead of only one conveyor belt, a plurality of conveyor belts can be provided, wherein one conveyor belt follows a main transport path and another conveyor belt follows a secondary transport path. Thereby, the containers can also be shifted or repositioned from a first conveyor belt to a second conveyor belt by a shifting means.

However, when the can flow is split into single-variety can flows, problems often arise that influence the overall can production process. Since many hundreds of millions of beverage cans are produced every day, even the smallest process impairments can have a significant impact.

It is therefore the object of the present disclosure to provide an apparatus and a method for selecting very fast moving containers, wherein the apparatus and the method should be designed in such a way that the overall process of the respective plant is influenced as little as possible.

According to the disclosure, the previously mentioned task is achieved by means of an apparatus for sorting containers, in particular, beverage containers. The apparatus according to the disclosure preferably comprises at least one conveyor belt for transporting a multitude of container units, an identification device for identifying a decor on each container unit conveyed on the conveyor belt, wherein, by means of the identification device, selection data can be generated depending on the decor present on a specifically detected container, and a selection device for repositioning individual container units on the conveyor belt depending on of the each identified decor, wherein the selection device forms a continuous track and has shifting means for shifting the identified container units, wherein the continuous track extends along the conveyor belt in a selection region, wherein the individual shifting means in the selection region can be accelerated to the same speed as the conveyor belt by means of a transport device and thereby, a specific and previously identified container unit is adjacent, wherein the control of the transport unit is carried out depending on the selection data, wherein the respective shifting means for shifting the adjacent container unit can be shifted in a direction inclined towards the transport direction of the conveyor belt.

This solution is advantageous because the containers to be shifted are only moved in one direction with relation to the conveyor belt, thereby reducing the risk of overturning individual containers. Furthermore, by synchronizing the speed of the transport device with the conveyor belt, the conveyor can be operated at a constant speed, thereby achieving a high throughput and the risk of overturning cans by acceleration forces (positive or negative ones).

Other preferred embodiments are discussed in the following parts of the description or the subclaims.

In accordance with a preferred embodiment of the present disclosure, by means of the conveyor belt, at least one set of containers on a main transport path of the identification device can be supplied, wherein the identification device comprises at least one camera device for optically detecting the decor of the containers, wherein, by means of an evaluation device, it is determined whether the specifically detected decor belongs to a first class of containers or to a second class of containers, wherein the containers of the first class are moved by the selection device on the main transport path by means of the conveyor belt and the containers of the second class are conveyed from the main path to a secondary path by the selection device, wherein an assignment of the position of the respective container to be transferred from the main path to the secondary path and of the position of a specific shifting means can be generated. This embodiment is favorable since a clear assignment between a specific container and a specific shifting means is created, whereby an individualized movement of the specific shifting means can be effectuated by means of the transport device.

In accordance with another preferred embodiment of the present disclosure, the conveyor belt conveys containers at a speed of at least 2 m/s, more preferably, at least 3 m/s or at least 3.5 m/s, or at least or precisely 4 m/s, or at a speed between 2 m/s and 10 m/s, more preferably between 3 m/s and 5 m/s. Preferably, containers are conveyed at a speed of 4 m/s. This embodiment is favorable since a large number of containers can be transported within a short time.

In accordance with another preferred embodiment of the present disclosure, the shifting means can be coupled with the transport device by means of magnetic couplings. This embodiment is advantageous because magnetic couplings are very fast and precisely controllable, which allows a high total throughput.

In accordance with another preferred embodiment of the present disclosure, each shifting means can be shifted by means of each at least one actuator in a direction orientated in an inclined manner towards the transport direction of the conveyor belt, wherein the actuator is an integral component of the selection device and can be moved along with the shifting means along the continuous track. Here, the actuator can be an electrically or pneumatically or hydraulically extendable device, in particular, corresponding to a lifting device.

A vacuum device is provided in accordance with a further preferred embodiment for the aspiration of the individual containers onto the conveyor belt, wherein the individual containers can be aspired by means of the vacuum onto the conveyor belt at least portionally along the main transport path and preferably portionally along the secondary transport path. This embodiment is favorable since aspiring the containers onto the conveyor belt, the risk of one or a plurality of cans falling over is reduced, whereby a higher conveyor speed and a curvier conveyor belt path is possible.

In accordance with another preferred embodiment of the present disclosure, each shifting means comprises at least one holding means, in particular, an aspiration means for stable movement of the respective container. This embodiment is favorable since, when coming into contact and/or moving the specific container by means of the deflection means, the risk of the container falling over is reduced, in particular, if a possible pneumatic aspiration effect to the floor of the container is eliminated or is reduced.

In accordance with another preferred embodiment of the present disclosure, the main transport path and the secondary transport path at least portionally run on the same conveyor belt. This embodiment is favorable since the containers do not have to be directed via interfaces (or lateral ends of two conveyor belts) between two conveyor belts and thus, the risk of the containers falling over is reduced.

In accordance with another preferred embodiment of the present disclosure, each container is a beverage can or a beverage bottle. The beverage can or beverage bottle is exclusively filled with air during transport on the conveyor belt, in particular, in the region of the identification device or in front of the identification device and immediately after the identification device.

Furthermore, the aforementioned problem is also solved by a method for sorting containers, in particular, beverage containers. Thereby, the method according to the disclosure preferably comprises at least the steps: transporting a multitude of container units on a conveyor belt; identifying a decor on each container unit conveyed on the conveyor belt by means of an identification device, wherein, by means the identification device, selection data is generated by the identification device depending on the decor present on a specifically detected container; repositioning of individual container units on the conveyor belt depending on the respectively identified decor by means of a selection device, wherein the selection device forms a continuous track and has shifting means for shifting the identified container units, wherein the continuous track extends along the conveyor belt in a selection region, wherein the individual shifting means in the selection region are accelerated by means of a transport device to the same speed as the conveyor belt, thereby being adjacent to a specific and previously identified container unit, wherein the control of the transport unit takes place depending on the selection data; shifting of the respective shifting means for shifting the adjacent container unit in a direction inclined towards the transport direction of the conveyor belt.

The present disclosure may further refer to an attachment for the production and/or for filling of cans, in particular beverage cans, wherein this plant comprises at least one apparatus according to the disclosure.

In all of the cases, in which the word is used within the scope of the present disclosure, the use of the word "essentially" preferably defines a deviation within the range of 1%-30%, more preferably 1%-20%, more preferably 1%-10%, more preferably 1%-5%, in particular 1%-2% from the determination, which would have been the case without the use of this word. Individual or all illustrations of the figures described in the following are preferably to be viewed as constructional drawings, meaning the dimensions, proportions, functional relationships and/or arrangements resulting from the figure(s) preferably correspond precisely or preferably essentially those of the apparatus according to the disclosure or of the product according to the disclosure. Other advantages, objectives and features of the present disclosure will be explained based on the following description of the enclosed drawings, in which apparatuses according to the disclosure are shown as an example. Elements of the apparatuses and method according to the disclosure, which, in the figures, at least essentially coincide with regard to their function can be identified using the same reference numbers, wherein these components and elements do not have to be numbered or explained in all figures. The disclosure shall now be described using the enclosed figures purely as an example.

BRIEF DESCRIPTION OF THE DRAWINGS

For the sake of example, the figures show:

FIGS. 1-6 schematically, the sorting of beverage containers by means of the apparatus according to the invention, wherein the repositioning of the containers by means of two containers is shown by way of example.

DETAILED DESCRIPTION

Figure 1:
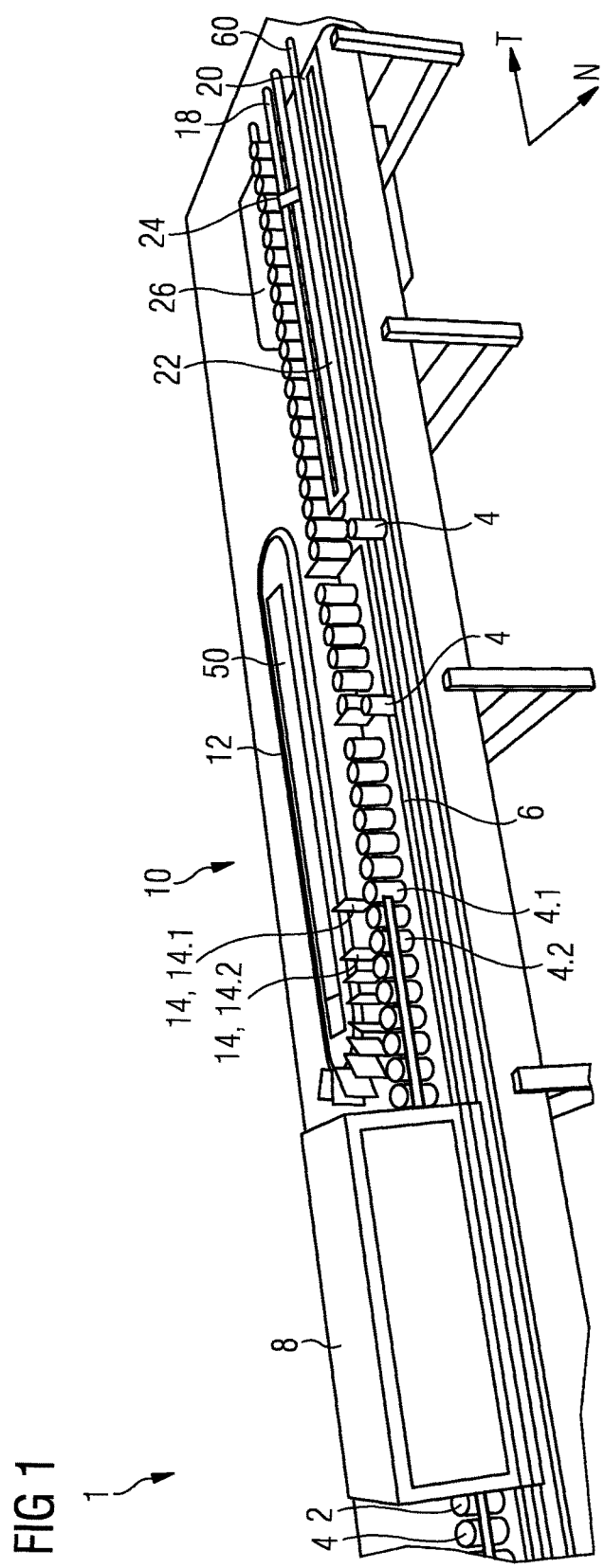

FIG. 1 shows a first exemplary state during a method for sorting containers with the apparatus 1 according to the disclosure. Optical characteristics of the containers 2, 4 are continuously detected by the identification device 8 and evaluated by an evaluation device. The detected characteristic is preferably the decor of the respective container 2, 4. Preferably, the containers 2, 4 are bottles or cans, in particular, for the holding beverages.

The identification device 8, in particular the evaluation device, generates data for controlling the transport device 50 so that shifting means 14 are moved along the continuous track 12 in such a way that they move at least in the transport direction T at the same speed as the containers 2, 4 transported on the conveyor belt 6. The shifting means 14 can be coupled with the transport device 50 by means of magnetic couplings 70, shown in FIG. 4. The apparatus 1 preferably forms a crossover 22, by means of which the transport paths are portionally separated from each other.

Furthermore, during the progression of the main transport path and/or during the progression of the secondary transport path, one separator device 24 or one for each can be arranged. The separator device preferably comprises a means for shifting or repositioning the containers. Here, the means for shifting or repositioning is preferably a compressed-air device or a mechanical element, such as a slider for example. This separator device 24 removes containers conveyed on one of the transport paths from the transport path. Preferably, by means of the separator device 24, separated containers 2a are supplied to a pick-up device 26 or another transport path.

Furthermore, FIG. 1 shows that the shifting means 14.1 has already been moved and the container 4.1 is adjacent. The shifting means 14.2 is also already adjacent to the container 4.2. Between the two containers 4.1 and 4.2, by way of pure example, a further container 2 is arranged, which is not repositioned. However, it may also be that a plurality of containers 4 are arranged directly one after the other on the conveyor belt 6. Furthermore, it is conceivable that a multitude, more preferably, exactly two or more than two containers 2, are arranged between two containers 4.

Figure 2:
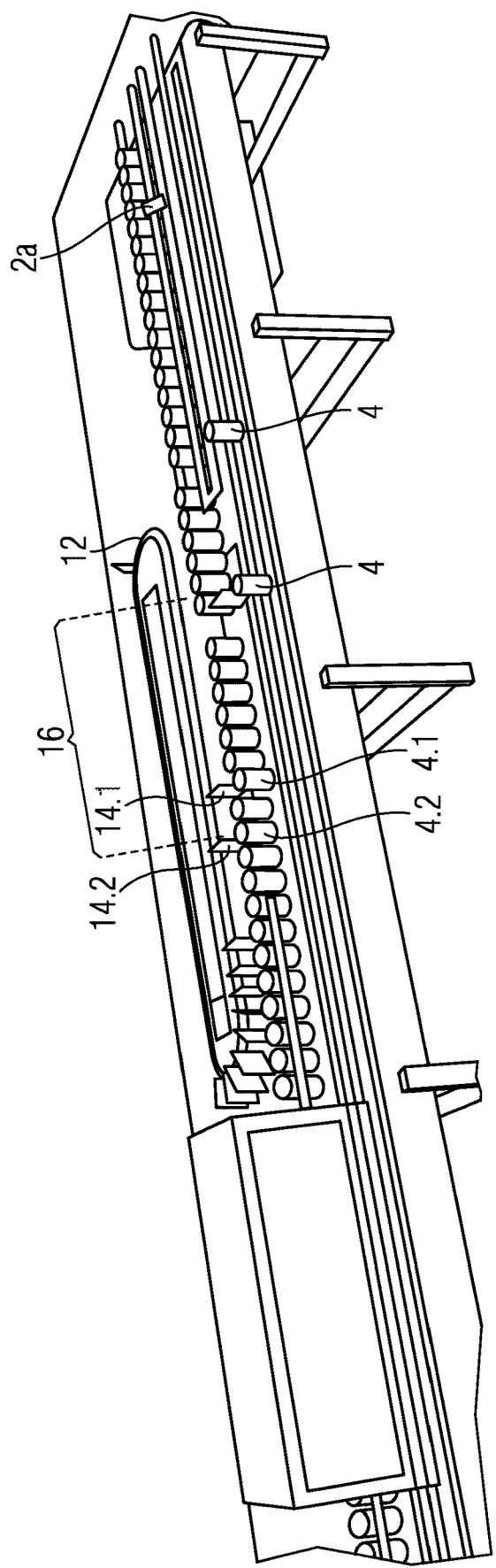

FIG. 2 shows that the shifting means 14.1 is already been deflected in an inclined manner towards the transport direction T, in particular, being orthogonally to it, and has thus come into contact with the container 4.1, whereby this is also deflected. In accordance with this illustration, the container 4.2 has not yet been shifted. Preferably, the deflection of the shifting means 14 in the direction N is carried out exclusively in the selection region 16.

Figure 3:
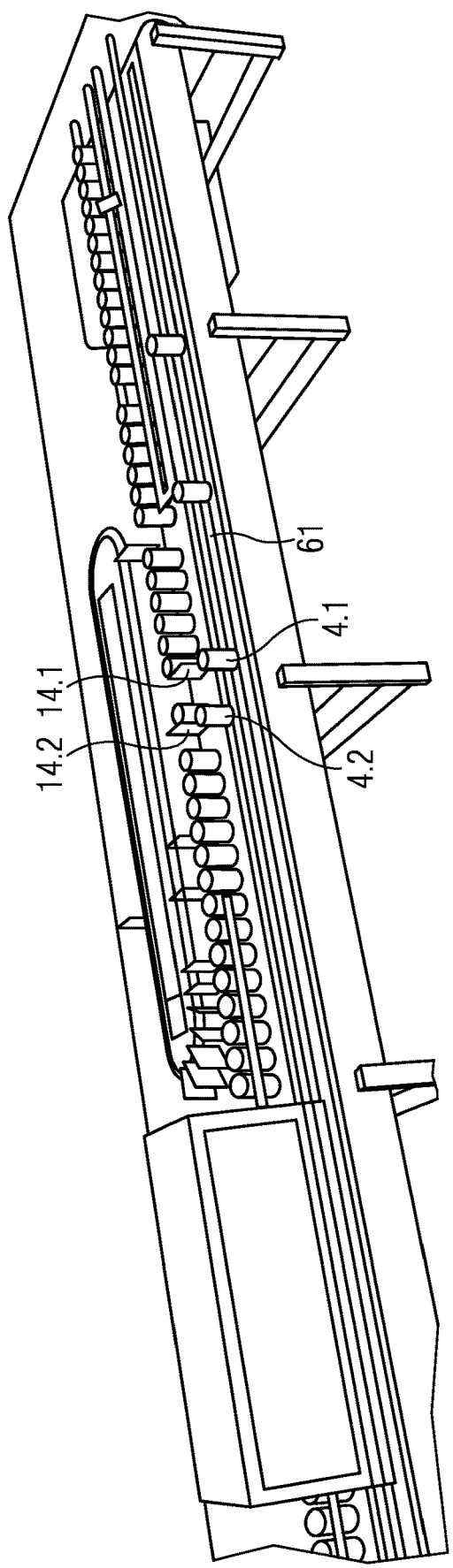

FIG. 3 shows that both shifting means 14.1 and 14.2 move the respective containers 4.1 and 4.2 in the direction transversely to the conveyor direction of conveyor belt 6. Preferably, the shifting means 14 move the containers from a first conveyor belt 6 to a second conveyor belt 61. The first conveyor belt 6 preferably moves along the main transport path 18 and the second conveyor belt 61 preferably moves along the secondary transport path 20. Preferably, these conveyor belts always move at the same speed, in particular, in the selection region 16. The shifting movement of the shifting means 14 is preferably effectuated by means of actuators. Preferably, each shifting means 14 comprises such an actuator, in particular, a lifting element or shifting element.

Figure 4:
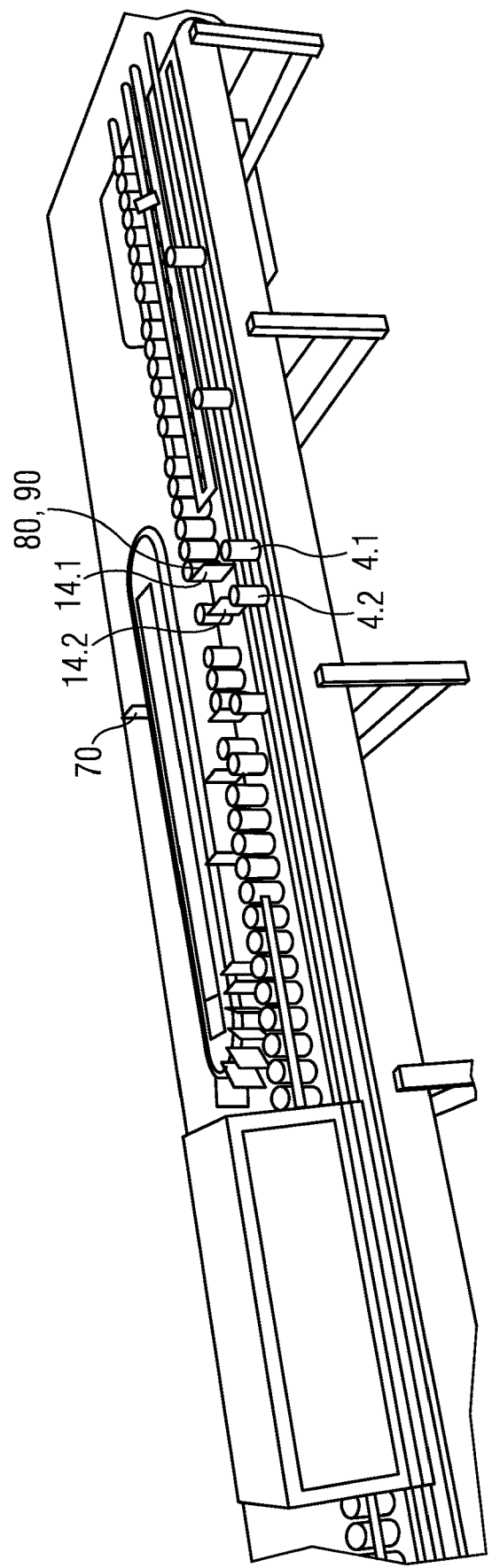

FIG. 4 shows that the container 4.1 has been conveyed to the secondary transport path 20 and the shifting element 14.1 is spaced away from the container 4.1. The shifting element 14.1 thereby moves back again. In accordance with this illustration, the second container 4.2 has already arrived at the secondary transport path 20, therefore, also the second shifting means 14.2 moves back into the initial position.

Figure 5:
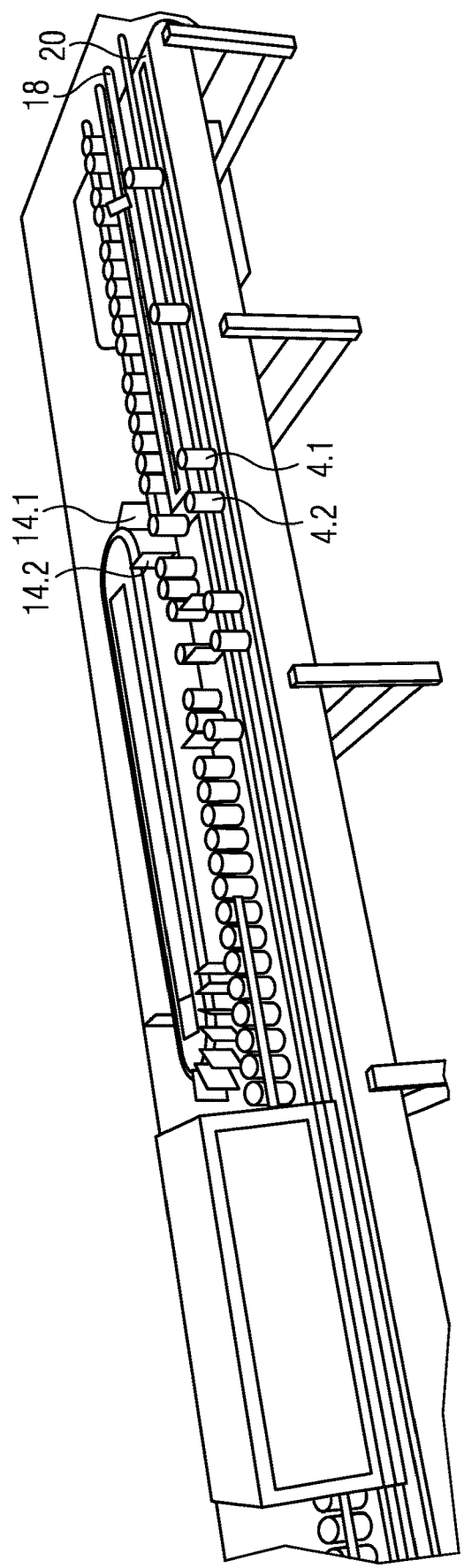

FIGS. 5 and 6 show that containers 4.1 and 4.2 are moved independently of the shifting means 14.1 and 14.2. The shifting means 14.1 and 14.2 are also in the initial configuration again, meaning not shifted and are moved across the continuous track 12 for further use back into the initial position or move back to the initial position along the continuous track 12 for further use.

Referring to FIG. 1, a vacuum device 60 may be provided for the aspiration of the individual containers 2,4 onto the conveyor belt 6, wherein the individual containers can be aspired by means of vacuum onto the conveyor belt at least portionally along the main transport path and preferably portionally along the secondary transport path. Furthermore, referring to FIG. 4, each shifting means 14.1, 14.2 may comprise at least one holding means 90, such as an aspiration means 80, for stable movement of the respective container.

The present disclosure therefore preferably refers to a sorting device 1 for sorting containers 2, 4, in particular, beverage containers. This apparatus 1 preferably comprises a conveyor belt 6 for transporting a multitude of container units 2, 4, an identification device 8 for identifying a decor on each container unit 2, 4 conveyed on the conveyor belt, wherein, by means of the identification device 8, selection data can be generated depending on the decor present on a specifically detected container 4, and a selection device 10 for repositioning individual container units 4 on the conveyor belt 6 depending on the respectively identified decor, wherein the selection device 10 forms a continuous track 12 and has shifting means 14 for shifting the identified container units 4, wherein the continuous track 12 extends along the conveyor belt 6 in a selection region 16, wherein the individual shifting means 14 in the selection region 16 can be accelerated to the same speed as the conveyor belt 6 by means of a transport device and thereby, a specific and previously identified container unit 4 is adjacent, whereby the control system of the transport unit is carried out depending on the selection data, wherein the respective shifting means 14 for shifting the adjacent container unit 4 can be shifted in a direction N inclined towards the transport direction T of the conveyor belt 6.

This disclosure is favorable since, for example, identical beverage containers, such as cans or bottles, can be provided with different decor until shortly before completion, in particular, of filling or empty packaging, and can be guided across the same handling path together, particularly if different apparatuses for decor application are used. A significant reduction in complexity can therefore be effectuated since the handling path in the plant does not have to be alternately used for one or the other type of container. Thus, all containers can also be conveyed at the same time, whereby the total flow of the plant is increased, wherein an emptying of the system is not required even when changing individual apparatuses for decor application.

REFERENCE LIST 1 apparatus
2 first container type
2a separated container of the first type of container
4 second container type
4.1 first exemplary container of the second type of container
4.2 second exemplary container of the second type of container
6 conveyor belt
8 identification device
10 selection device
12 continuous track
14 shifting means
14.1 first exemplary shifting means
14.2 second exemplary shifting means
16 selection region
18 main transport path
20 secondary transport path
22 crossover
24 separator device
26 pick-up device
50 transport device
60 vacuum device
61 second conveyor belt
70 magnetic coupling
80 aspiration means
90 holding means
N inclined direction
T transport direction

The invention claimed is:

1. An apparatus for sorting of containers, the apparatus comprising:
a conveyor belt for transporting a multitude of containers,
an identification device for identifying a decor on each container conveyed on the conveyor belt, wherein, by means of the identification device, selection data can be generated depending on a respective decor present on a specifically detected container,
a selection device for repositioning individual containers on the conveyor belt depending on the respectively identified decor,
wherein the selection device forms a continuous track and has multiple shifting means for shifting the identified containers, wherein the continuous track extends along the conveyor belt in a selection region, wherein each shifting means in the selection region can be accelerated to a same speed as the conveyor belt by means of a transport device, thereby being assigned to a specific and previously identified container, wherein the transport device is controllable depending on the selection data, wherein a respective shifting means can be actuated for shifting an adjacent container in a direction that extends at an angle relative to a transport direction of the conveyor belt, and wherein the shifting means are couplable with the transport device by magnetic couplings.

2. The apparatus according to claim 1, wherein at least one set of containers can be supplied to the identification device on a main transport path by the conveyor belt,
wherein the identification device comprises at least one camera device for optically detecting the decor of each of the containers,
wherein an evaluation device is configured to determine whether the detected decor of each of the containers belongs to a first class of containers or to a second class of containers,
wherein the containers of the first class are movable by the selection device on the main transport path using the conveyor belt and the containers of the second class are conveyable from the main transport path to a secondary transport path by the selection device,
wherein, by means of the selection data, an assignment of a position of a respective container to be transferred from the main transport path to the secondary transport path and of a position of a specific shifting means can be generated.

3. The apparatus according to claim 1, wherein the conveyor belt is configured to convey the containers at a speed of at least 2 m/s.

4. The apparatus according to claim 1, wherein each shifting means can be shifted in a direction orientated in an inclined manner towards the transport direction of the conveyor belt by means of at least one actuator, wherein the at least one actuator is an integral part of the selection device and is moveable together with the shifting means along the continuous track.

5. The apparatus according to claim 1, further comprising a vacuum device for sucking the individual containers to the conveyor belt, wherein the individual containers can be sucked at least portionally along a main transport path by means of the vacuum device.

6. The apparatus according to claim 1, wherein each shifting means comprises at least one holding means for stable movement of a respective container.

7. The apparatus according to claim 2, wherein the main transport path and the secondary transport path at least portionally run on the same conveyor belt.

8. The apparatus according to claim 1, wherein each container is a beverage can or beverage bottle, wherein the beverage can or beverage bottle is exclusively fillable with air during transport on the conveyor belt.

9. A method for sorting containers, the method comprising:
transporting of a multitude of container units on a conveyor belt,
identification of a decor on each container unit conveyed on the conveyor belt by means of an identification device, wherein, by means of the identification device, selection data are generated depending on a respective decor present on a specifically detected container,
repositioning of individual container units on the conveyor belt depending on the respectively identified decor by means of a selection device,
wherein the selection device forms a continuous track and has multiple shifting means for shifting the identified container units, wherein the continuous track extends along the conveyor belt in a selection region, wherein each shifting means in the selection region is accelerated to a same speed as the conveyor belt by means of a transport device, thereby being adjacent to a specific and previously identified container unit, wherein control of the transport device takes place depending on the selection data, and the shifting means are couplable with the transport device by magnetic couplings, and
wherein the repositioning comprises shifting a respective shifting means for shifting an adjacent container unit in a direction that extends at an angle relative to a transport direction of the conveyor belt.

10. The apparatus according to claim 1, wherein the conveyor belt is configured to convey the containers at a speed of at least 3 m/s.

11. The apparatus according to claim 1, wherein each shifting means comprises at least one aspiration means.

12. The apparatus according to claim 5, wherein the individual containers can be aspired at least portionally along the secondary transport path to the conveyor belt by means of the vacuum device.

13. An apparatus for sorting of containers, the apparatus comprising:
a conveyor belt for transporting a multitude of containers;
an identification device for identifying a decor on each container conveyed on the conveyor belt, wherein, by means of the identification device, selection data can be generated depending on a respective decor present on a specifically detected container;
a selection device for repositioning individual containers on the conveyor belt depending on the respectively identified decor, wherein the selection device forms a continuous track and has multiple shifting means for shifting the identified containers, wherein the continuous track extends along the conveyor belt in a selection region, wherein each shifting means in the selection region can be accelerated to a same speed as the conveyor belt by means of a transport device, thereby being assigned to a specific and previously identified container, wherein the transport device is controllable depending on the selection data, wherein a respective shifting means can be actuated for shifting an adjacent container in a direction that extends at an angle relative to a transport direction of the conveyor belt; and
a vacuum device for sucking the individual containers to the conveyor belt, wherein the individual containers can be sucked at least portionally along a main transport path by the vacuum device.

14. The apparatus according to claim 13, wherein at least one set of containers can be supplied to the identification device on a main transport path by the conveyor belt,
wherein the identification device comprises at least one camera device for optically detecting the decor of each of the containers,
wherein an evaluation device is configured to determine whether the detected decor of each of the containers belongs to a first class of containers or to a second class of containers,
wherein the containers of the first class are movable by the selection device on the main transport path using the conveyor belt and the containers of the second class are conveyable from the main transport path to a secondary transport path by the selection device,
wherein, by means of the selection data, an assignment of a position of a respective container to be transferred from the main transport path to the secondary transport path and of a position of a specific shifting means can be generated.

15. The apparatus according to claim 14, wherein the main transport path and the secondary transport path at least portionally run on the same conveyor belt.

16. The apparatus according to claim 13, wherein the conveyor belt is configured to convey the containers at a speed of at least 2 m/s.

17. The apparatus according to claim 13, wherein each shifting means can be shifted in a direction orientated in an inclined manner towards the transport direction of the conveyor belt by means of at least one actuator, wherein the at least one actuator is an integral part of the selection device and is moveable together with the shifting means along the continuous track.

18. The apparatus according to claim 13, wherein each shifting means comprises at least one holding means for stable movement of a respective container.

19. The apparatus according to claim 13, wherein each container is a beverage can or beverage bottle, and each beverage can or beverage bottle is exclusively fillable with air during transport on the conveyor belt.

* * * * *